Figures 1, 2, 3, 4, 5:
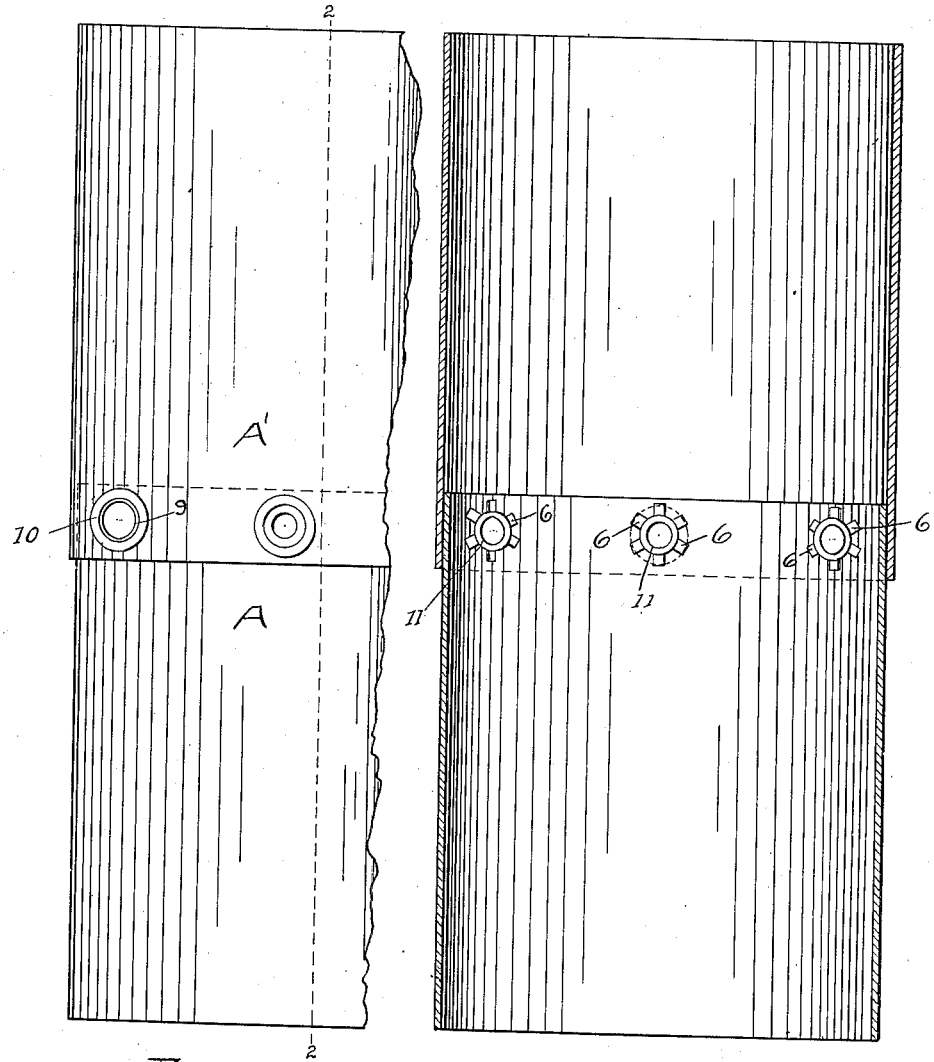

H. BROWN.
TUBULAR RIVET.
APPLICATION FILED JAN. 5, 1911.

1,011,151.

Patented Dec. 12, 1911.

Witnesses
Dennis Dalton
A. L. Phelps

Inventor
Hayes Brown

By C. C. Shepherd
Attorney

UNITED STATES PATENT OFFICE.

HAYES BROWN, OF HARRISBURG, OHIO, ASSIGNOR OF ONE-HALF TO JEREMIAH S. McKINLEY, OF ORIENT, OHIO.

TUBULAR RIVET.

1,011,151.  Specification of Letters Patent.  Patented Dec. 12, 1911.

Application filed January 5, 1911. Serial No. 601,032.

*To all whom it may concern:*

Be it known that I, HAYES BROWN, a citizen of the United States, residing at Harrisburg, in the county of Franklin and State of Ohio, have invented certain new and useful Improvements in Tubular Rivets, of which the following is a specification.

The present invention relates to certain novel and useful improvements in tubular rivets, and has particular application to a rivet adapted especially for fastening together sections of piping, conductors or other tubular articles.

As is well known, in joining sections of pipe, such as rain spouting and other tin or galvanized sheet metal pipe, it has been necessary to place an anvil or block within the pipe at the point where the sections overlap and to then drive the rivet through the two sections, so that the rivet was driven between the anvil and the tool held by the operator. This work has been tedious and difficult, especially when the sections to be joined were relatively long ones.

In carrying out my invention, it is my purpose to provide a construction of rivet, whereby the sections of tubing may be connected from the outside, that is, without employing an anvil or block within the pipe, a tool in the hands of the operator being all that is necessary to position the rivet.

Still a further object of my invention is to provide a rivet which will embody the features of strength, durability and cheapness of manufacture.

With the above recited objects and others of a similar nature in view, my invention consists in the construction, combination and arrangement of parts set forth in and falling within scope of the appended claim.

In the accompanying drawings—Figure 1 is a view in elevation of a portion of two sections of tubing or piping and showing the same connected by my improved rivets, Fig. 2 is a cross sectional view taken on the line 2—2 of Fig. 1, Fig. 3 is an enlarged view in side elevation of one of my improved rivets, Fig. 4 is a sectional view of the rivet shown in Fig. 3, and, Fig. 5 is a view in elevation of a screw adapted to be used in conjunction with my rivet.

Referring now to the accompanying drawings in detail, the letters A and A' designate two sections of tubing or piping which are to be connected together, said sections being shown as overlapped.

The letter B indicates my improved rivet as an entirety, said rivet comprising the tubular shank portion 5 provided with a series of longitudinally extending slots 6, the walls 7 between the slots being bulged or bowed outwardly as at 8 to impart the necessary resiliency or spring to the rivet.

The numeral 9 designates the head of the rivet which is provided with an extending flange 10, while 11 designates the shank of the rivet of reduced diameter and circular in form, said shank being interiorly threaded as at 12 for the purpose hereinafter described.
In the employment of my invention, such as in joining sections of tubing and the like, the operator first places the two sections of piping such as A A' end to end, one section overlapping the other, and then proceeds to punch or otherwise form openings in the overlapping end portions, so that the openings through the pipes are in alinement. The operator then threads the rivet on to a tool by passing the shank of the tool down through the rivet and threading the end of said tool shank into engagement with the threaded surface 12 at the shank of the rivet. The operator then actuates the tool so that one jaw of the latter presses against the flange 10 and holds the same firmly against the exterior of the piping, and the other portion of the tool, which is threaded into the end 11 of the rivet, is drawn upward carrying with it the body of the rivet and flattening the same as is shown in Fig. 2, the sides expanding and bearing against the interior of the tubing.

It will be noted that I have provided an exceedingly strong and simple form of rivet, which may be used for joining sections of piping or the like. Should it be desired to close the rivet, as in connecting semi-circular sections of tubing, such as eaves troughs or the like, I may employ a screw such as is shown at C in Fig. 5, the shank of said screw being threaded into the shank of the rivet.

What I claim, is—

A rivet comprising an annular head, an inner concentric reinforced portion on said head, said head being bored, a tubular sleeve extending from the walls of the bore of said head and longitudinally split, said split portions being bowed, a tubular shank forming the extremity of said sleeve, and internal threads on said shank.

In testimony whereof I affix my signature in presence of two witnesses.

HAYES BROWN.

Witnesses:
WM. PRETSCH,
L. F. SHEPHERD.